United States Patent

Bailey et al.

[11] 3,762,786
[45] Oct. 2, 1973

[54] ENGINE BEARING ARRANGEMENT
[75] Inventors: John M. Bailey, Dunlap; Alan W. Wells, Peoria, both of Ill.
[73] Assignee: Caterpillar Tractor Co., Peoria, Ill.
[22] Filed: Dec. 23, 1971
[21] Appl. No.: 211,284

[52] U.S. Cl. .............................................. 308/237
[51] Int. Cl. ............................................. F16c 9/02
[58] Field of Search .................. 308/DIG. 4, 237 A, 308/122, 9

[56] References Cited
UNITED STATES PATENTS
2,532,795  12/1950  Underwood et al. .......... 308/DIG. 4

*Primary Examiner*—Charles J. Myhre
*Assistant Examiner*—Frank Susko
*Attorney*—Paul S. Lempio

[57] ABSTRACT

A split bearing is mounted on the journal of a crankshaft by pin means which permit the bearing to move radially, but prevents it from rotating relative to the journal. Lubrication means is provided for communicating lubricating oil between the journal and bearing and also between the bearing and a supporting journal box.

5 Claims, 5 Drawing Figures

PATENTED OCT 2 1973

*INVENTOR*
JOHN M. BAILEY
ALAN W. WELLS

BY
Fryer, Tjensvold, Feix, Phillips & Lempio
ATTORNEYS

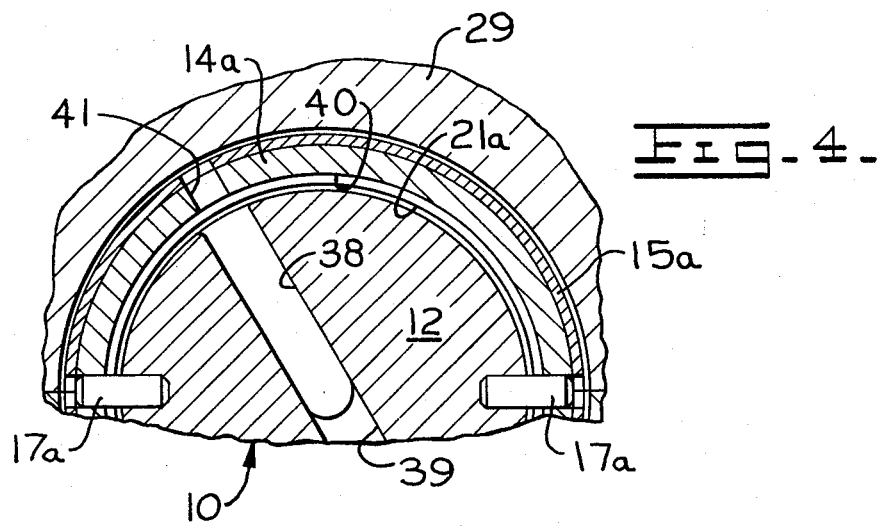
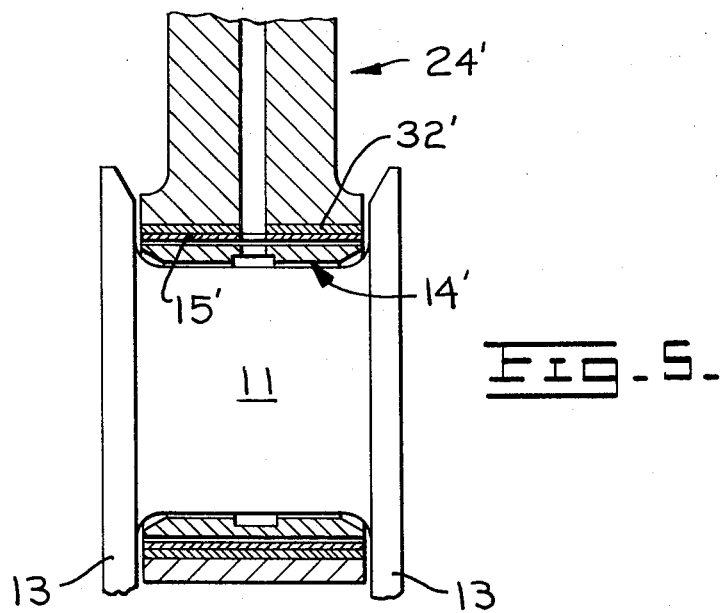

ENGINE BEARING ARRANGEMENT

BACKGROUND OF THE INVENTION

Conventional split bearings are assembled around the journal of an engine driven crankshaft and secured to a journal box to prevent rotation of the bearings. One difficulty encountered with this arrangement, for example, is that insufficient surface area contact is provided between the connecting rod and bearing, particularly when employed in a high-performance engine. The insufficient surface area contact is normally created due to fillets formed thereon which are normally required for strengthening purposes. Chamfers are accordingly formed at the ends of the bearing to provide clearance for the fillets.

The conical surface areas defined by the chamfers reduce the bearing surface area used to support the shaft to thus create a high load to area ratio which induces scuffing of the bearing surface. A further disadvantage of such conventional bearing arrangements stems from their securance to the journal box which supports the crankshaft to allow the crankshaft to rotate relative to the bearing. In addition to lubrication problems, a bearing failure will normally damage the crankshaft thus necessitating replacement or removal and reworking thereof.

SUMMARY AND OBJECTS OF THIS INVENTION

An object of this invention is to overcome the above, briefly described problems by providing an economical, durable and readily serviceable bearing mounted on the journal of a shaft, such as an engine-driven crankshaft. The bearing rotates with the shaft, but is permitted to move radially thereon to provide maximum bearing surface contact with a supporting journal box as defined at an optimum radius from the longitudinal center line of the journal. In the preferred embodiment, lubrication means is provided for communicating lubricating oil between the journal and bearing and also between the bearing and journal box.

BRIEF DESCRIPTION OF THE DRAWINGS

FIG. 4 is an enlarged, partial section of the rod bearing shown in FIG. 3; and

FIG. 5 is a view similar to FIG. 1, but showing a modification of this invention.

DESCRIPTION OF THE PREFERRED EMBODIMENTS

Figure 1:
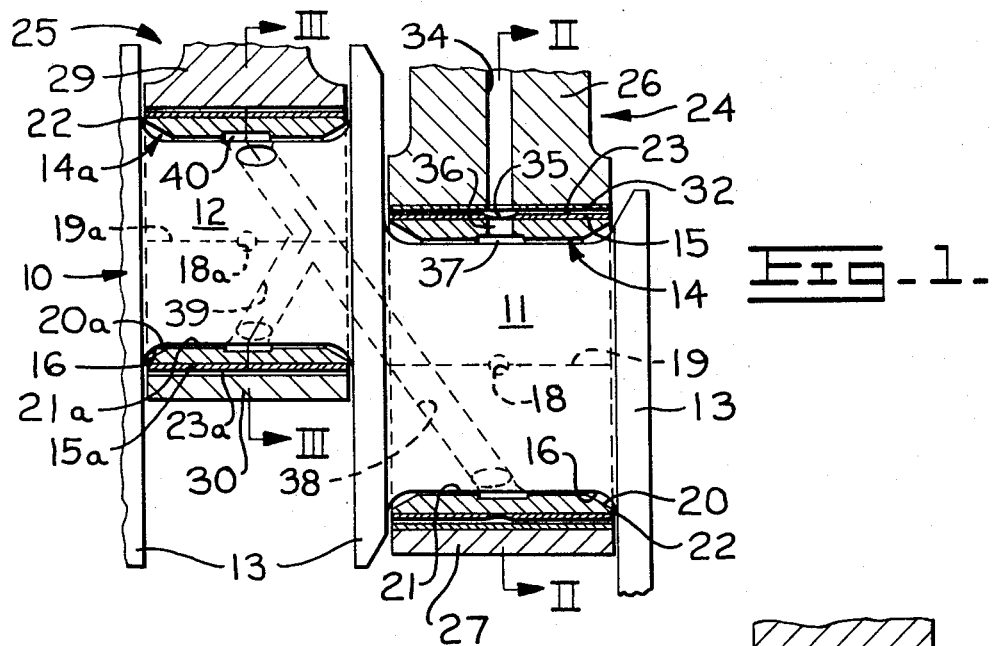
FIG. 1 is a longitudinal section taken through a portion of a crankshaft, showing a connecting rod bearing and a main bearing arrangement therefor.

In the preferred embodiments of this invention shown in FIGS. 1—4, an engine driven crankshaft 10 has at least one main journal 11 and one offset connecting rod journal 12 formed thereon. A radially extending flange 13 is positioned laterally at each side of bearing means 14 and 14a for journals 11 and 12, respectively. Bearing 14, for example, preferably has a layer 15 of a standard bearing material formed thereon. Fillets 16 are formed on the crankshaft to strengthen same at their connection between a flange and a respective journal.

Since the bearing means are substantially identical, primary emphasis will be placed on describing the details of bearing 14 for journal 12. Corresponding constructions of the two symmetrical bearing means are depicted by the same numeral, but with the numerals depicting constructions employed in bearing means 14a each being accompanied by an a.

The first ends of a pair of diametrically opposed pins 17 (FIG. 2), disposed on an axis transversely intersecting a longitudinal axis of journal 11, are press-fitted into or otherwise suitably secured to the crankshaft. The pins serve as drivers and locators for the substantially identical, semi-cylindrical halves of split bearing 14. A split aperture 18 is formed at each pair of abutting edges 19 of the bearing halves for loosely receiving the second end of each pin therein. Each end of the cylindrical bearing has a continuous conically shaped surface 20 formed thereon to diverge radially outwardly from an inner surface 21 to an end 22 of the bearing. Each conical surface provides clearance with respect to an opposed fillet 16 to obtain a maximum bearing surface area 23 on the periphery of the bearing.

Figure 3:
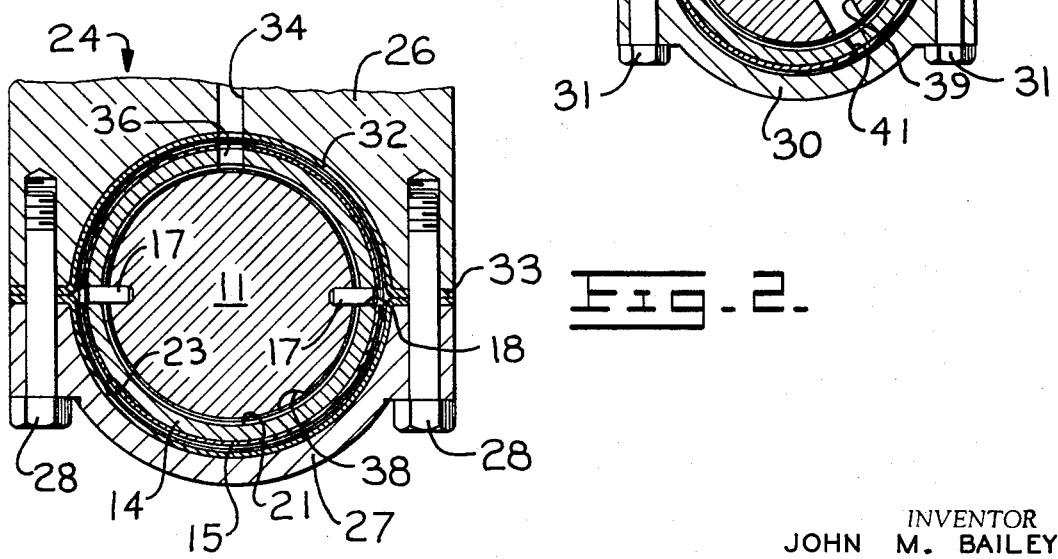
FIG. 3 is a transverse section of the rod bearing taken on the line III—III in FIG. 1.
Figure 2:
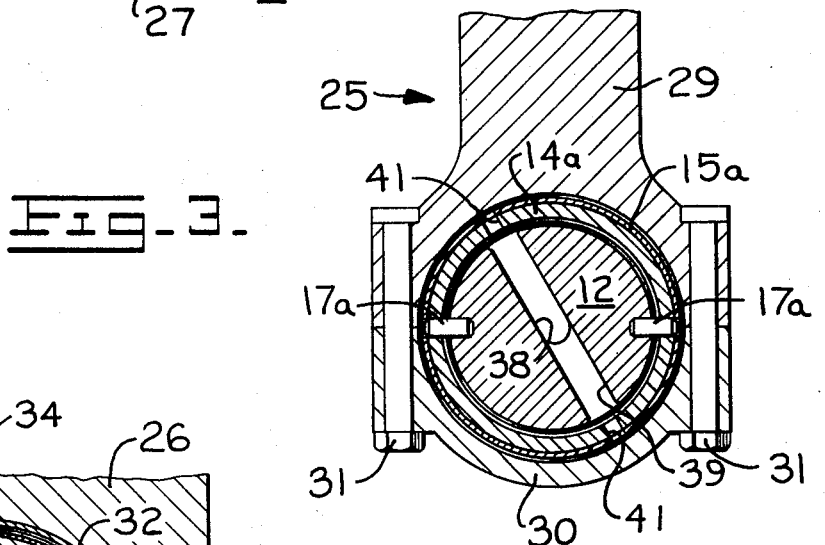
FIG. 2 is a transverse section of the main bearing taken on the line II—II in FIG. 1.

Rotation of shaft 10 and its cylindrical journals 11 and 12 causes bearings 14 and 14a to rotate therewith and relative to their respective journal boxes 24 and 25. Journal box 24 consists of a conventional engine block segment 26 and its mating cap 27, secured in place by bolts 28 (FIG. 2). Journal box 25 may comprise a piston rod 29 having a cap 30 attached thereto by bolts 31 (FIG. 3).

Certain applications may require the use of a wear member, such as a split shell member 32, since the journal box may be composed of cast iron or the like. The semi-cylindrical halves of the wear member may comprise overlying and radially extending flanges 33 clamped in a fixed manner between block segment 26 and cap 27. Relative rotation thus occurs between the inner surface of the wear member and the outer surface of bearing material 15.

Floating means are provided for permitting limited radial movements of bearing means 14 and 14a relative to journals 11 and 12, respectively, but for preventing relative rotation from occurring therebetween. In the illustrated FIG. 2 embodiment, for example, such floating means comprises the outer surface of journal 11 which has a diameter less than the diameter of opposed inner cylindrical surface 21 of the bearing means to provide a clearance therebetween. In addition, pins 17 permit the bearing to move radially relative to the shaft, but prevent it from rotating relative thereto. As suggested above, the bearing arrangement for journal 12 is constructed in a similar manner with like numerals depicting corresonding constructions.

Lubrication means continuously communicates an oil film between the above-described journals and bearings and bearings and journal boxes in the following manner. Pressurized lubricating oil in a passage 34 flows through a shallow, annular groove 35 formed exteriorly on bearing 14 for providing an oil film between the hardened outer surface of the bearing and the inner surface of shell member 32. Simultaneosly, oil flows through a radial port 36, formed through the bearing wall, and into a shallow, annular groove 37 formed interiorly on the bearing to supply an oil film between inner surface 21 of the bearing and the outer surface of journal 11.

A slanted passage 38 is drilled in the crankshaft to communicate lubricant to a branch passage 39 and to a shallow, annular groove 40 (FIG. 4) formed interiorly on bearing 14a, to provide an oil film between the inner surface of the bearing and outer surface of journal 12. As clearly shown in FIG. 4, groove 40 further communicates with a port 41 formed through the wall of bearing 14a to provide an oil film between the outer surface of the bearing and the opposed, cylindrical inner surface internally defined on the connecting rod and cap. The oil film communicated between the crankshaft and bearings prevents fretting therebetween whereas the oil film communicated between the relatively rotating bearings and the respective journal boxes continuously inhibits scoring and related problems normally encountered with conventional bearing assemblies.

In the FIGS. 1—4 bearing applications, layers 15 and 15a of bearing material are bonded or otherwise suitably secured to the outer surfaces of the respective bearings. FIG. 5 illustrates a modification thereof wherein a layer 15' of bearing material, similar to layers 15 and 15a, is suitably secured to a shell member 32' mounted in a journal box 24' rather than to a bearing 14'. The remaining constructions are substantially identical to those shown in FIG. 1.

What is claimed is:

1. A rotatable shaft having a cylindrical shaft journal formed thereon, a journal box, a cylindrical bearing, comprising a pair of semi-cylindrical parts substantially abutting at diametrically opposed pairs of parallel edges thereof, rotatably mounting said shaft journal on said journal box and means for permitting limited radial movements of said bearing relative to said shaft journal but for preventing said bearing from rotating relative to said shaft journal upon rotation of said shaft, said means comprising at least one pair of diametrically opposed pins each secured to said shaft to extend radially outwardly into a mating aperture formed through said parts at a respective pair of parallel edges thereof.

2. The invention of claim 1 wherein an outer cylindrical surface formed on said bearing has a diameter less than the diameter of an opposed, inner cylindrical surface formed on said journal box.

3. The invention of claim 1 wherein said shaft is an engine-driven crankshaft having at least one main journal and at least one offset rod journal formed thereon, each one of said main and rod journals mounted on a respective journal box by a said bearing.

4. The invention of claim 3 wherein said crankshaft comprises a radially extending flange positioned laterally at each side of each bearing, each flange connected to a respective journal by a rounded fillet, each lateral end of each of said bearings having means forming a surface internally thereon to provide a clearance between each end of each bearing and a respective one of said fillets.

5. The invention of claim 1 further comprising lubrication means for continuously communicating lubricating oil between said shaft journal and said bearing and between said bearing and said journal box.

* * * * *